United States Patent [19]
Miyoshi et al.

[11] 3,929,461
[45] Dec. 30, 1975

[54] FUSION-OXIDATION PROCESS FOR RECOVERING VANADIUM AND TITANIUM FROM IRON ORES

[75] Inventors: T. Kenneth Miyoshi, Lakewood; Cornelius E. Berthold, Littleton; Frank M. Stephens, Jr., Lakewood, all of Colo.; Alfred K. Schellinger, South Perth W.A., Australia

[73] Assignee: Ferrovanadium Corporation N.I., Perth, W.A., Australia

[22] Filed: Feb. 27, 1974

[21] Appl. No.: 446,156

[52] U.S. Cl. .......................... 75/30; 75/24; 423/68
[51] Int. Cl.² .......................................... C21B 3/04
[58] Field of Search ............... 75/21, 24, 30; 423/68

[56] References Cited
UNITED STATES PATENTS

| 1,534,819 | 4/1925 | von Seth | 75/60 |
| 3,753,681 | 8/1973 | Vojkovic | 75/24 |

*Primary Examiner*—M. J. Andrews
*Attorney, Agent, or Firm*—Sheridan, Ross & Fields

[57] ABSTRACT

Vanadium and titanium values are recovered from vanadium containing titaniferous iron ore by subjecting the ore to a reduction process to separate the iron from the slag containing the vanadium and titanium, fusing the slag with an alkali metal salt, oxidizing the vanadium to its plus five oxidation state, and recovering the vanadium and titanium by conventional techniques.

8 Claims, No Drawings

FUSION-OXIDATION PROCESS FOR RECOVERING VANADIUM AND TITANIUM FROM IRON ORES

BACKGROUND OF THE INVENTION

1. Field of the Invention

This process relates to the recovery of chemical compounds, and more specifically, to rare element compound recovery as classified in Class 23, subclass 15.

2. The Prior Art

Numerous vanadium recovery processes are disclosed in the prior art. It is well known, as for example in U.S. Pat. No. 3,733,193, to recover vanadium by means of a "salt roast" process whereby an alkali metal salt is admixed with the vanadium-containing ore or slag and the mixture roasted under oxidizing conditions at a suitable temperature. The resulting $V_2O_5$ is recovered by water or dilute acid leaching. While this process is of value, it is not usually possible to lower the $V_2O_5$ level in the leached residue to below 1.00% to 0.75%. Such a relatively high $V_2O_5$ level in the leached residue makes the leached residue unfit for some uses, i.e., for use in titanium pigment manufacture in cases where the leached residue contains a suitably high titanium level.

The process described in U.S. Pat. No. 3,486,842 to Michal discloses an improved vanadium recovery by roasting the ore in a two-stage operation in the presence of an alkali metal salt. This process necessitates two separate roasts, the first designed to pelletize the ore combined with the alkali metal salt and the second serving as the actual roast. This obviously necessitates addtitional expensive equipment over a single roast process. Also this process utilizes a sintering technique which results in relatively highly impure titanium values.

U.S. Pat. No. 2,270,444 to Jenness discloses a process for recovering vanadium by forming an intermediate alkali earth metal salt fusion product with the ore. Other similar references have disclosed such a fusion technique, but operate under reducing conditions wherein the vanadium is recovered along with the iron.

The various prior art processes, exemplified by the above referenced patents, each have drawbacks that result in a low vanadium recovery along with leached residues containing not less than 1.00 to 0.75% $V_2O_5$, when low grade vanadium-bearing ores or slags (1% to 2% $V_2O_5$) are used as the feed material. In contrast, the process of the present invention can result in an increased vanadium recovery when operated on low-grade vanadium-bearing ores and slags, such that leached residues of 0.20 to 0.40% $V_2O_5$ content are obtained. This is important not only from a vanadium recovery standpoint, but also from the standpoint of utilizing the residue following the leach; for example, in the manufacture of titanium pigments. If this residue contains too much vanadium, i.e., 0.75% or more $V_2O_5$ content, the value of this residue for titanium pigment manufacture is greatly reduced, as elaborate and expensive purification steps are required to remove this vanadium during the manufacture of such titanium pigments.

The process of the present invention has been found to produce high vanadium recoveries from relatively low grade slags and ores and also yield a leach residue containing a low $V_2O_5$ level.

SUMMARY OF THE INVENTION

Vanadium and titanium are recovered from slags and ores containing vanadium values by fusing the vanadium containing raw material with an alkali metal salt and oxidizing the resulting fusion product either in the molten state or subsequent to solidification in order to oxidize the vanadium to its plus five oxidation state. The vanadium can then be recovered by conventional techniques, leaving the titanium-bearing residue substantially vanadium free.

It is preferred to initially subject the vanadium-containing ore to electric smelting under reducing conditions in the presence of sufficient alkali metal salt so as to melt the ore and reduce the contained iron to pig iron. The vanadium and titanium values (plus impurities such as silica and alumina) remain in the molten slag phase, while the iron separates from this slag.

The molten pig iron is removed from the mixture and the molten slag is oxidized to convert the vanadium to its plus five oxidation state. This vanadium is then conventionally recovered leaving a substantially vanadium-free residue.

DESCRIPTION OF THE PREFERRED EMBODIMENTS

The critical aspect of this process is the fusion of the material containing the vanadium with an alkali metal salt, followed by oxidation of the vanadium. It is believed that the vanadium exists in the slag in the form of spinel-type crystallites, and while in this form the vanadium is not easily subject to the necessary oxidation reaction. By producing an intermediate fusion product with an alkali metal compound the slag is physically altered and the vanadium does not crystallize in the same manner. This greatly facilitates the oxidation.

In order to produce the necessary molten slag at least a critical amount of alkali metal salt must be added to the vanadium-bearing material for a given temperature prior to or during melting. Excess alkali metal salt can be employed, but this is economically not advantageous. The amount of alkali metal salt which must be added to produce fusion and the resulting altered slag at a given temperature varies for different ore samples, and is dependent upon the impurities in the ore samples, the amount of vanadium and other factors. Therefore, prior to employing the process of the invention to a particular ore or slag, experimental testing is required to obtain the most desirable parameters. For most ores and slags it has been found that for a temperature of about 1,400°C to 1,500°C an alkali metal compound in the range of preferably about 1 to about 50 percent, more preferably from about 2 to about 25 percent, and most preferably from about 5 to about 15 percent based on slag weight should be employed. However, it must be emphasized that these ranges are provided only as average values as one particular ore sample may require, for example, 13 percent by weight of an alkali metal compound, while another may require only, for example 2 percent.

Similarly the temperature necessary to produce the fusion reaction is a function of the amount of alkali metal employed, as well as the amount of vanadium in the ore sample, the amount of impurities, etc. Therefore, again experimentation must be performed on a given ore sample in order to determine the optimum conditions of temperature for that sample. Bearing in mind that the critical aspect of the process is to produce fusion or melting it becomes a matter of economic priorities in selecting the proper balance between the amount of alkali metal salt and the temperature. Average values of temperatures are preferably from about 1300°C to about 1700°C, more preferably from about 1400°C to about 1600°C and most preferably from about 1400°C to about 1500°C, but of course the temperature must be at least sufficient to produce fusion of the slag with the alkali metal compound.

It is generally preferred that for a given ore body containing both iron and vanadium that the iron be recovered prior to vanadium recovery. This is accomplished by means well known in the art, as for example reducing the ore to separate the iron from the other constituents, herein referred to as slag. This separation is facilitated by the addition of alkali metal salt prior to the reduction process. The alkali metal salt used is then available for the fusion reaction with the slag, although generally there is an insufficient amount and additional alkali metal salt usually must be added to the slag to produce the fusion. While it is generally preferred to perform the process of the invention on the slag, some ore samples are amenable to direct vanadium recovery without prior removal of the iron utilizing this process.

The slag fusion is preferably accomplished in the same operation as the iron separation. Alternatively a two-stage heating operation may be employed wherein iron is separated during the initial step and the slag is fused during a secondary step.

While it is generally preferred to carry out the process of this invention upon a molten slag, such as described above, it is also possible to utilize an ore, or concentrate derived therefrom, without prior removal of the iron.

After the alkali metal salt has been added to the molten slag it is preferred to fully oxidize the constituents of the slag by an oxygen lancing, wherein pure oxygen gas is blown into the molten slag. Sufficient heat is generated by the oxidation of the ferrous iron to the ferric state to keep the slag molten. The oxidation of the slag by oxygen lancing insures that all of the vanadium values are fully oxidized to the plus five valance state so that they can form soluble alkali metal vanadates which are recovered upon subsequent leaching of the slag. While pure oxygen is preferred from a processing standpoint, oxygen mixed with inerts, for example air, may also be employed.

It is generally preferable to conduct the oxidation roast in the presence of water vapor to facilitate complete oxidation of the vanadium when the oxidation is conducted on a solidified slag. The roasted calcines may then be cooled prior to introduction into the leaching stage or may be quenched directly from the roast. Quenching may be preferable when the vanadium collects in a glassy phase formed in the roast as the vanadium is more soluble in this form than in a crystalline state which forms upon slower cooling.

Leaching of the vanadium from the salt roast calcines with water generally is preferred providing sufficient extraction is obtainable. The water leach solution will generally become basic due to the alkali remaining after the roasting operation. Any iron compounds present in the calcines remain with solids in the basic leach, thus simplifying further processing. An acid leach may also be used to extract additional vanadium values, or a combination water/acid leach may be utilized. Leaching with acid may dissolve any iron present in the calcine in sufficient quantities so as to hinder later separation and contribute impurities to the final product. Hence when acid leaching is employed the value of additional vanadium extracted must be balanced against this disadvantage.

The vanadium-bearing solutions obtained by leaching can be processed by various means well known to those skilled in the art. For example, vanadium may be precipitated as ammonium metavanadate after concentration and purification is accomplished in a solvent extraction system.

The preferred alkali metal compounds used in conjunction with this process are the sodium salts, due to their availability. Particularly sodium hydroxide, sodium carbonate, sodium chloride and sodium sulfate are effective and easily obtainable. It must be understood however that from a purely processing standpoint compounds such as those of potassium, lithium, rubidium, and cesium may also be used in practicing the invention.

EXAMPLE 1

A titanium slag containing a vanadium equivalent of 1.77% $V_2O_5$ was fused at 1400°C with sodium carbonate equal to 10% of the slag weight for a period of 2 hours. Following air cooling of the melt and grinding, the magnetic particles larger in size than 100-mesh were removed, thereby increasing the vanadium content of the altered slag to 2.0% $V_2O_5$. The altered slag was salt roasted with sodium chloride equal to 10% of the altered slag weight for two hours at 850°C in an oxidizing atmosphere containing water vapor. The residue, after acid leaching, contained 0.35% $V_2O_5$, equivalent to 84.6% vanadium recovery. Vanadium extraction of 74.3% had been obtained by the water leach prior to leaching with acid.

EXAMPLE 2

The original titanium slag of Example 1 was fused with sodium chloride equal to 20% of the slag weight. Removal of the magnetic particles larger in size than 100-mesh, after grinding, increased the vanadium content of the altered slag to 1.84% $V_2O_5$. Subsequent salt roasting and leaching, as performed in Example 1, resulted in a final residue containing 0.40% $V_2O_5$, representing a 79.4% recovery. The water leach, prior to leaching with an acid, had extracted 63.8% of the contained vanadium.

EXAMPLE 3

The original titanium slag of Example 1 was fused with sodium sulfate equal to 10% of the slag weight. The altered slag contained 1.83% $V_2O_5$ after grinding and removal of the magnetic particles larger than 100-mesh. The salt roasting and leaching were performed as in Example 1. The final leach residue contained 0.46% $V_2O_5$ or 74.6% of the vanadium had been extracted. The water leach, prior to leaching with acid, had extracted 66.4% of the contained vanadium.

EXAMPLE 4

A slag, altered as in Example 1 and containing 1.96% $V_2O_5$, was air oxidized at 750°C for 1 hour. Roasting with a salt addition was omitted from this test. Leaching of the calcine was performed in the manner described in Example 1 for leaching of the salt roast calcine. The final leach residue contained 0.74% $V_2O_5$ or 65.9% of the contained vanadium had been extracted. Vanadium extraction of 48.3% had been obtained by leaching with water prior to the acid leach.

EXAMPLE 5

By way of comparison the original titanium slag of Example 1 was directly salt roasted under the same salt roasting conditions used in Example 1 without alkali metal salt fusion. The maximum vanadium extraction obtained upon salt roasting of the original slag at the conditions cited in Example 1 was 60.4% after leaching with acid. The corresponding water leach extracted 39.1% of the contained vanadium. The final leach residue contained 1.02% $V_2O_5$, thus making it unsuitable for $TiO_2$ pigment manufacture.

EXAMPLE 6

A titanium-bearing slag, containing 2.09% vanadium, calculated as $V_2O_5$, prepared by electric smelting a mixture of titanomartite ore, coal and about 8% sodium carbonate, based on the weight of the slag forming constituents present, was air oxidized to remove residual carbon and then mixed with 10% by weight of sodium nitrate and fused at 1430°C in an alumina crucible to simulate vigorous oxidation of the slag. Upon leaching the melt in water it was found that 73% of the contained vanadium was water extractable and that an additional 17% was recovered with a dilute acid leach. The final devanadated residue contained about 0.20% $V_2O_5$ and was an excellent starting material for titanium pigment manufacture.

EXAMPLE 7

For comparison purposes the titanium-bearing slag of Example 6 was air oxidized to remove residual carbon and was then admixed with 10% by weight of sodium carbonate and fused at 1440°C in a graphite crucible to maintain a reducing environment.

Upon subsequent leaching this slag it was found that only 1.5% of the contained vanadium could be extracted by combined water and dilute acid leaching, thus illustrating the necessity for an oxidative environment in practicing this invention.

EXAMPLE 8

These tests were carried out with no fusion or melting of the slag with an alkali metal salt. The mixture of slag and alkali metal salt was heated to below the melting point, but to a temperature where sintering took place. Two portions of 200 grams each of an electric furnace slag, containing 2.07% vanadium calculated as $V_2O_5$ were heated to 1360°C (2480°F) with, respectively, 10% sodium carbonate and with 20% sodium chloride, for a period of 2 hours. No melting or fusion of the charge took place in either case, but the mixtures were heavily sintered.

After the heating step, both charges were ground to pass a 65 mesh screen and roasted 850°C (1562°F) for two hours to insure oxidation of the vanadium present. The material was then subjected to a combination of water and acid leaching to extract the vanadium values therefrom.

A total of 43% of the vanadium was extracted from the slag used in the sintering roast with sodium carbonate, while 18% of the vanadium was extracted where sodium chloride was used in the sintering roast. The resulting titanium-bearing residues therefore were inadequate for titanium pigment manufacture.

EXAMPLE 9

A series of fusion or melting tests were carried out on a slag containing 1.8% vanadium, calculated as $V_2O_5$ to determine the optimum quantity of alkali metal salt required to maximize vanadium extractability. The various mixtures of the slag and sodium carbonate were fused at 1400°C (2552°F) for 2 hours, followed by an oxidizing roast at 850°C (1562°F) with supplementary alkali metal salt additions. The oxidized products were then water and acid leached in the usual manner yielding the following results:

| QUANTITY OF SODIUM CARBONATE | PERCENT VANADIUM EXTRACTED |
| --- | --- |
| 2% | 66% |
| 5% | 70% |
| 10% | 86.6% |

What is claimed is:

1. A process for the recovery of vanadium from vanadium-bearing ores comprising:
   reducing the ore to recover substantially all of the iron and to produce a slag containing the vanadium,
   treating the slag with an alkali metal salt in sufficient quantity to produce a completely fused product upon sufficient heating of the slag and so heating the slag and alkali metal salt thereby forming an altered slag,
   oxidizing the molten altered slag in order to oxidize the vanadium to its plus five valance state,
   leaching the slag to extract the oxidized vanadium, and
   recovering the vanadium from the leach solution.

2. The process of claim 1 wherein an alkali metal salt is introduced prior to the reduction of the ore.

3. The process of claim 1 wherein the alkali metal salt is a sodium salt.

4. The process of claim 1 wherein the slag is treated with at least one percent (1%) based on slag weight of the alkali metal salt.

5. The process of claim 1 wherein the slag is heated to a temperature of about 1300°C to 1700°C.

6. In a process for the recovery of vanadium and titanium from vanadium-bearing titaniferous ores wherein the process comprises reducing the ore to recover substantially all of the iron and to produce a slag containing the vanadium and titanium, oxidizing the molten slag to oxidize the vanadium to its plus five valance state, and recovering the oxidized vanadium from the slag, the improvement comprising:
   fusing the completely slag with an alkali metal compound prior to oxidizing the slag.

7. A process for the recovery of vanadium and titanium from vanadium-bearing titaniferous ores comprising:
   reducing the ore in the presence of an alkali metal salt to recover substantially all of the iron and to produce a slag containing the vanadium and titanium;
   heating the slag in the presence of an alkali metal salt to produce a completely molten altered slag,
   oxidizing the molten altered slag in order to oxidize substantially all of the vanadium to its plus five valance state, and recovering substantially all of the oxidized vanadium from said altered slag.

8. A process for the recovery of vanadium and titanium from vanadium-bearing titaniferous ores comprising:
 treating the ore with an alkali metal salt;
 reducing the ore with the alkali metal salt to recover iron and to produce a slag containing the vanadium and titanium;
 treating the slag with additional alkali metal salt such that the slag contains at least 1% based on slag weight of said alkali metal salt;
 completely melting the slag and alkali metal salt to form an altered slag;
 oxidizing the molten altered slag in order to oxidize the vanadium to its plus five valance state; and
 leaching the slag to extract the oxidized vanadium and to produce a titnaium bearing residue.

* * * * *